United States Patent
Bruder (10) Patent No.: US 7,618,080 B2
(45) Date of Patent: Nov. 17, 2009

(54) MOVABLE VEHICLE ROOF ASSEMBLY

(75) Inventor: Gernot Bruder, Karlsruhe (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 355 days.

(21) Appl. No.: 11/743,864

(22) Filed: May 3, 2007

(65) Prior Publication Data
US 2007/0262605 A1 Nov. 15, 2007

(30) Foreign Application Priority Data
May 3, 2006 (DE) .................... 10 2006 020 758

(51) Int. Cl.
*B60J 7/14* (2006.01)
(52) U.S. Cl. .................... 296/108; 296/107.17
(58) Field of Classification Search ........... 296/108, 296/107.12, 107.16, 107.17
See application file for complete search history.

(56) References Cited

U.S. PATENT DOCUMENTS 6,811,205 B2 * 11/2004 Salz et al. .............. 296/108

| | | | |
|---|---|---|---|
| 7,237,823 B2 | 7/2007 | Bruder et al. | |
| 2004/0094987 A1 | 5/2004 | Salz et al. | |
| 2006/0138800 A1 | 6/2006 | Bruder et al. | |

FOREIGN PATENT DOCUMENTS

| DE | 101 16 094 A1 | 10/2002 |
|---|---|---|
| DE | 10 2004 059 793 B3 | 4/2006 |
| EP | 1 361 966 B1 | 11/2003 |
| WO | WO 03/047896 A1 | 6/2003 |

* cited by examiner

Primary Examiner—Joseph D Pape
(74) Attorney, Agent, or Firm—Brooks Kushman P.C.

(57) ABSTRACT

A vehicle includes a roof, a roof part kinematic system (RPKS), and a transmission kinematic system (TKS). The roof includes roof parts movably connected together to be movable between a closed position in which the parts cover the vehicle interior and a stored position in which the roof parts expose the vehicle interior. The RPKS includes a guide rod pivotably supported at one end about a vehicle body-side rotary joint and pivotably supported at another end to one of the parts to movably connect the part to the vehicle such that upon RPKS actuation the RPKS moves the roof part between the positions. The TKS has a spring connected at one end to the guide rod. The spring acts on the guide rod with a swivel torque about the first rotary joint during the part transfer. The spring orientation traverses the first rotary joint during the part transfer.

18 Claims, 6 Drawing Sheets

MOVABLE VEHICLE ROOF ASSEMBLY

CROSS-REFERENCE TO RELATED APPLICATIONS

This application claims foreign priority benefits under 35 U.S.C. § 119(a)-(d) to DE 10 2006 020 758.0, filed May 3, 2006, which is hereby incorporated by reference in its entirety.

BACKGROUND OF THE INVENTION

1. Field of the Invention

The present invention relates to convertible or folding vehicle roofs.

2. Background Art

DE 101 16 094 A1 describes a vehicle having a convertible roof. A roof kinematic system connects the roof to the vehicle to move the roof between a closed end position in which the roof covers the vehicle interior and a stored end position in which the roof is folded and stored in a storage compartment of the vehicle. A transmission kinematic system is upstream of the roof kinematic system to improve the leverage ratios of the roof kinematic system. The transmission kinematic system provides a better leverage ratio in each end position so that the roof can be lifted from each end position against its weight with less expenditure of force. Further, the transmission kinematic system ensures a slow and impact-free roof motion between the end positions by decelerating the roof as the roof approaches an end position during transfer from the other end position. The transmission kinematic system consumes a relatively large amount of space.

SUMMARY OF THE INVENTION

An object of the present invention is to move a convertible or folding vehicle roof between closed and stored positions with a low expenditure of force.

In carrying out the above object and other objects, the present invention provides a vehicle having a roof, a roof part kinematic system, and a transmission kinematic system. The roof has roof parts movably connected together such that the roof parts are movable between a closed position of the roof in which the roof parts cover the vehicle interior and a stored position of the roof in which the roof parts expose the vehicle interior. The roof part kinematic system has a front guide rod pivotably supported at one end about a first vehicle body-side rotary joint and pivotably supported at another end to one of the roof parts to movably connect the roof part to the vehicle body such that upon actuation of the roof part kinematic system the roof part kinematic system moves the roof part between the closed and stored positions. The transmission kinematic system has a spring connected at one end to the front guide rod. The spring acts on the front guide rod with a swivel torque about the first rotary joint during the transfer of the roof part between the closed and stored positions. The orientation of the spring traverses the first rotary joint during the transfer of the roof part between the closed and stored positions.

Also, in carrying out the above object and other objects, the present invention provides a movable roof assembly for a vehicle. The roof assembly includes a roof, a roof part kinematic system, and a transmission kinematic system. The roof has roof parts movably connected together such that the roof parts are movable between a first end position and a second position. The roof part kinematic system has a front guide rod pivotably supported at one end about a first rotary joint and pivotably supported at another end to one of the roof parts such that upon actuation of the roof part kinematic system the roof part kinematic system moves the roof part between the end positions. The transmission kinematic system has a spring connected at one end to the front guide rod. The spring acts on the front guide rod with a swivel torque about the first rotary joint during the transfer of the roof part between the end positions. The orientation of the spring traverses the first rotary joint during the transfer of the roof part between the end positions.

In an embodiment of the present invention, a movable vehicle roof assembly includes a roof having roof parts, a roof part kinematic system, and a transmission kinematic system. The roof part kinematic system includes pivotably supported front and rear guide rods which movably connect a roof part to the vehicle body for moving the roof part between a closed position (i.e., an end position) of the roof in which the roof covers the vehicle interior and a stored position (i.e., another end position) of the roof in which the roof is stored within a rear storage compartment of the vehicle. The transmission kinematic system includes a spring. One end of the spring engages with the front guide rod and acts on the front guide rod with a swivel torque acting about a vehicle body-side rotary joint of the front guide rod. When the roof is at a first end position, the torque of the spring pushes the front guide rod towards the opposite second end position. As such, the spring torque acts in the opposite direction from the torque resulting from the intrinsic weight of the roof and the roof part kinematic system which acts upon the roof part in the first end position. Consequently, the spring acts against the intrinsic weight of the roof part so that the expenditure of force necessary to lift the roof part from the first end position is reduced.

During the transfer motion of the roof from the first end position to the second end position, the spring orientation (i.e., the line or direction of action of the spring) traverses past the position of the rotary joint for the front guide rod with which the spring engages. Due to the traversal of the spring orientation past the position of this rotary joint, the spring orientation reverses so that spring action decelerating further transfer motion of the roof part towards the second end position arises from the spring action initially supporting the lifting motion from the first end position. The change between the supporting, lifting, and decelerating spring actions occur in the region of the highest point of the roof part during the transfer of the roof between the end positions. The highest point of the roof part (i.e., the maximum raised position of the roof part) is reached approximately halfway through the roof closing and opening motions. When the roof part passes the maximum raised position, the weight of the roof part no longer acts toward the first end position, but instead acts toward the second end position. The action of the elastic force decelerates the transfer motion so that the roof part reaches the second end position at a reduced or little speed. This has the advantage that additional measures for decelerating the roof part motion may be omitted. On account of the very low approach speed of the roof part toward the second end position a gentle contact results at the second end position, thereby preventing stresses for the involved components.

In an embodiment of the present invention, the base of the spring facing away from the front guide rod changes in position as a function of the position of the roof part during the transfer of the roof from one end position to the other end position. This occurs via a kinematic coupling to the roof part kinematic system such that the adjustment motion of the roof part kinematic system automatically results in a displacement of the spring base and no additional actuators are necessary.

In addition, displacement of the spring base influences the spring orientation (i.e., the spring action) and the leverage ratio according to which the spring acts on the front guide rod. Combining both effects, i.e., the change in angle of the spring action and the change in position of the spring base, may be used for a desired positive influence for reducing the lifting force of the roof part from each end position and for decelerating the roof part as the roof part approaches the opposite end position.

In an embodiment of the present invention, the spring base is mounted on a spring lever of the transmission kinematic system. The spring lever is pivotably supported on the vehicle body and is connected to the rear guide rod of the roof part kinematic system. The spring, the spring lever, and the front and rear guide rods form a four-bar kinematic linkage for moving the roof part between the closed and stored positions of the roof. However, different roof part kinematic systems may be used such as multiple-bar kinematic linkages like seven-bar kinematic linkages. The design of the pivotably supported spring lever which engages with the spring base has the advantage of a relatively simple design in which use may be made of the swivel motion of the spring lever for changing the spring orientation and the position of the spring base. In particular, the motion of the spring base assists in traversal of the spring orientation past the rotary joint for the front guide rod.

In an embodiment of the present invention, when the roof part is moved between the closed and stored positions of the roof, the spring orientation also traverses past the position of the rotary joint for the spring lever on which the spring base is mounted. It is practical for the spring orientation to traverse past the position of the rotary joint for the spring lever and past the position of the rotary joint for the front roof guide rod approximately at the same time. Until the position of the rotary joint for the spring lever is reached, the spring base is supported on the rear guide rod via the spring lever so that the front and rear guide rods are acted upon with force by the spring in the direction of the opposite end position. Traversal past the rotary joint for the spring lever causes the direction of spring action to reverse also at the rear guide rod. Since the position of the rotary joint for the front guide rod is also passed at the same time, the direction of spring action likewise reverses with respect to the front guide rod so that the initial supporting spring action in both guide rods is then reversed to a decelerating action in both guide rods. It is desirable for the traversal past the direction of spring action in the guide rods to occur when the maximum lifted position of the roof part is reached.

The supporting action starting from an end position applies to both the closed and stored positions. The spring action also reverses upon reaching the maximum raised position of the roof part for both roof motions, i.e., in the transfer of the roof from the closed position to the stored position, and vice versa.

The spring is under pretension in each end position to achieve the necessary supporting action. The spring may be either a compression spring or a tension spring.

The transmission kinematic system together with the spring is used to hold the roof in the region of static equilibrium, or with only a slight deviation therefrom, to the greatest extent possible in all its positions, so that the primary function of the actuator for adjusting the roof part kinematic system is only to move the roof against frictional forces and inertial forces, thus allowing correspondingly smaller actuators to be used. The same advantage is realized when the roof is to be manually adjusted. As little or greatly reduced lifting and deceleration forces are necessary, it is possible to manually move the roof between its closed and stored positions in spite of the relatively high intrinsic weight of the roof.

The combination of the two elastic effects of the spring, i.e., the force of the spring at the connection point to the pivotably supported front guide rod and the reaction force in the spring base, which is transmitted to the rear guide rod via additional levers and guide rods, results in minimization of the highest magnitude of the drive torque considered over the entire motion sequence. Peaks in momentum in the opening or closing process of the roof may be avoided. Although in individual roof positions during the transfer between the stored and the closed position the spring in its connection point and base may have opposing actions on the guide rods, a strong action of the spring on a guide rod may be compensated for by an opposite action on the other guide rod. By the suitable selection of the connection points and geometries, the roof motion automatically controls the supporting action of the spring.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Identical or similar components have the same reference numerals in the figures.

Figure 1:
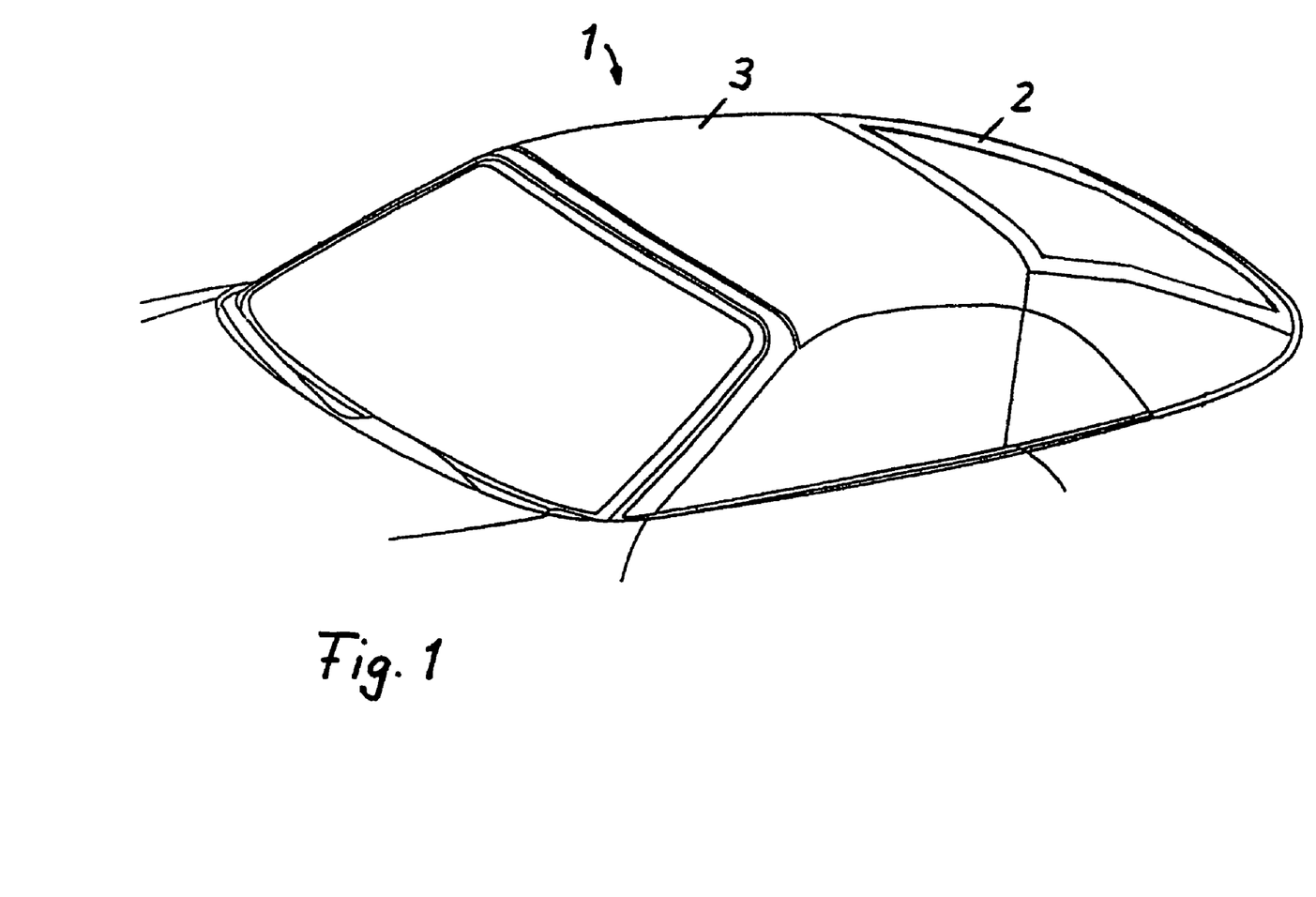
FIG. 1 illustrates a perspective view of a vehicle roof having front and rear roof parts movable between a closed position in which the roof parts cover the vehicle interior and a stored position in which the roof parts are stored within a rear storage compartment of the vehicle in accordance with an embodiment of the present invention with the roof being in the closed position.

Referring now to FIG. 1, a perspective view of a roof 1 for a vehicle in accordance with an embodiment of the present invention is shown. Roof 1 is a two-part hardtop including a rear roof part 2 and a front roof part 3. Roof parts 2, 3 are movable between a closed end position in which roof parts 2, 3 cover the vehicle interior and a stored end position in which roof parts 2, 3 are folded on top of one another and stored within a rear storage compartment of the vehicle. As such, roof parts 2, 3 are pivotable about at least one center of rotation fixed to the vehicle body. Rear roof part 2 includes a rear window integrated therein. In accordance with other embodiments of the present invention, roof 1 is a soft-top having a fabric cover on an adjustable folding top linkage and/or has three or more roof parts which have at least one center of rotation fixed to the vehicle body.

FIG. 1 illustrates roof 1 in its closed position. In the closed position of roof 1, roof parts 2, 3 extend between the windshield frame at the front end of the vehicle and a trunk lid at the rear end of the vehicle. The trunk lid covers a storage compartment at the rear end of the vehicle. Roof parts 2, 3 are folded and moved into the storage compartment for storage therein in the stored position of roof 1. Roof parts 2, 3 are pivotably connected to one another to fold and unfold relative to one another as roof parts 2, 3 are being moved between the closed and stored positions of roof 1.

A roof kinematic system having kinematic linkages respectively associated with roof parts 2, 3 movably connect roof parts 2, 3 to the vehicle body to move roof parts 2, 3 between the closed and stored positions of roof 1. The kinematic linkages are actuated by an actuator to move roof parts 2, 3 between the closed and stored positions of roof 1. The kinematic linkages ensure an unambiguously kinematically determined transporting motion of roof parts 2, 3 between the closed and stored positions of roof 1.

The actuator actuates the roof kinematic system to open (or close) roof 1 when roof 1 is in the closed (or stored) position causing roof parts 2, 3 to lift up from the closed (stored) position and swivel rearward (forward) into the stored (closed) position. The relative position of roof parts 2, 3 with respect to one another and with respect to the vehicle body changes during the transfer between the closed and stored positions. Roof parts 2, 3 pass through an intermediate position between the closed and stored positions in which the center of gravity of roof parts 2, 3 is lifted to a maximum raised position. Until this position is reached, the actuator applies an actuating force acting against the intrinsic weight of roof parts 2, 3 which acts upon roof parts 2, 3 in either starting end position. When the maximum raised position is passed, the intrinsic weight of roof parts 2, 3 (and of the roof kinematic system) acts toward the opposite end position. The function of the actuator is to control the motion of roof parts 2, 3 such that roof parts 2, 3 approach the opposite end position with relatively little speed. For this purpose, the actuator acts against the intrinsic weight of roof parts 2, 3 after roof parts 2, 3 pass the maximum raised position to decelerate the movement of roof parts 2, 3.

Referring now to FIGS. 2, 3, 4, 5, and 6, with continual reference to FIG. 1, a roof part kinematic system 4 movably connecting front roof part 3 to vehicle body 7 and a transmission kinematic system 8 movably connecting roof part kinematic system 4 to vehicle body 7 in accordance with a first embodiment of the present invention is shown. FIGS. 2, 3, 4, 5, and 6 illustrate roof part 3, roof part kinematic system 4, and transmission kinematic system 8 at various phases between the closed position of roof 1 and the stored position of roof 1. FIGS. 2, 3, 4, 5, and 6 illustrate an embodiment of the present invention with reference to front roof part 3. Other embodiments of the present invention are with reference to rear roof part 2 and/or front roof part 3.

Figures 2, 3:
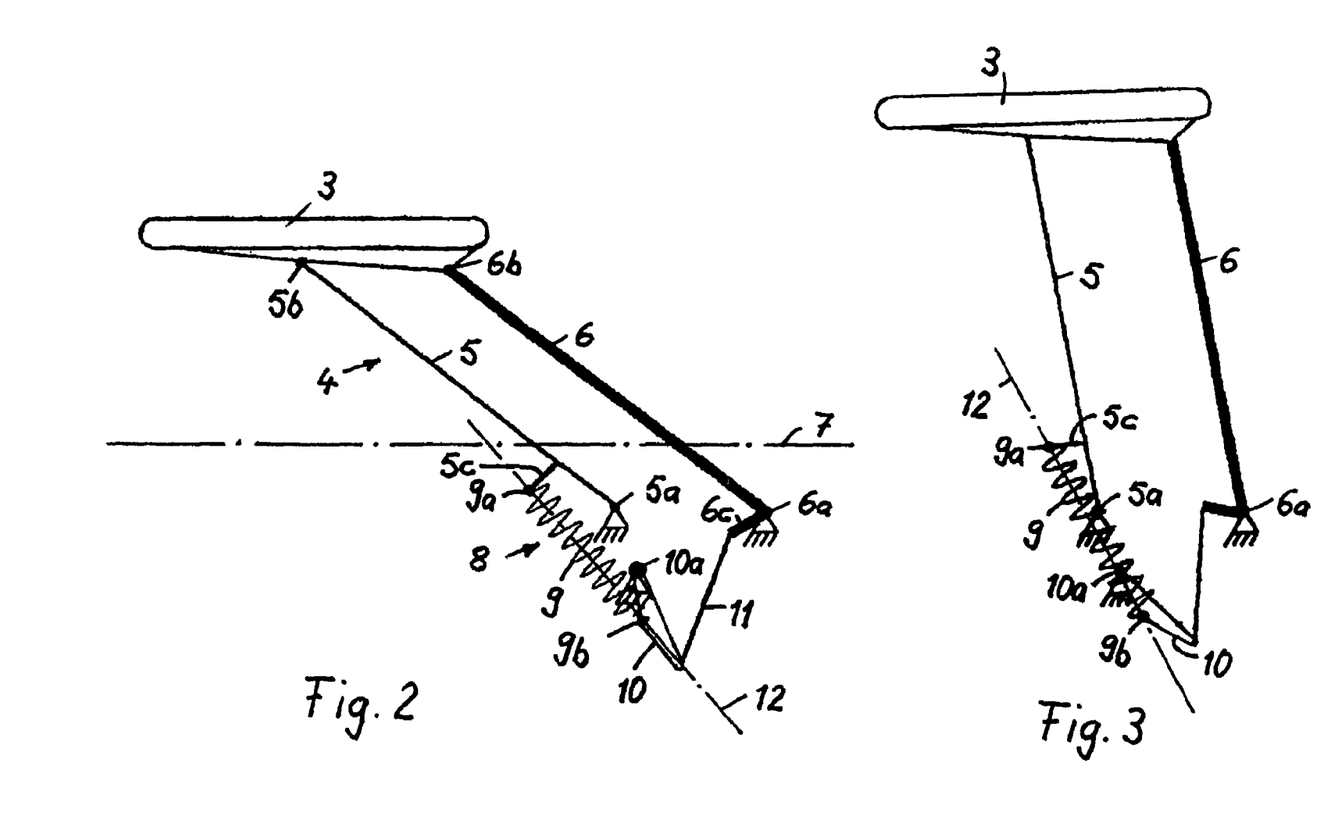
FIG. 2 illustrates a roof part kinematic system movably connecting the front roof part to the vehicle body and a transmission kinematic system movably connecting the roof part kinematic system to the vehicle body in accordance with a first embodiment of the present invention with the roof being in the closed position.
FIG. 3 illustrates the front roof part, the roof part kinematic system, and the transmission kinematic system at an intermediate position shortly before a maximum raised position of the front roof part between the closed and stored positions of the roof during transfer of the roof from the closed position to the stored position in accordance with the first embodiment of the present invention.

FIG. 2 illustrates front roof part 3, roof part kinematic system 4, and transmission kinematic system 8 at the closed position of roof 1. Roof part kinematic system 4 movably connects roof part 3 to vehicle body 7 such that roof part 3 is movable between the closed and stored positions of roof 1. Roof part kinematic system 4 is a four-bar kinematic linkage having parallel front and rear roof guide rods 5 and 6. Front guide rod 5 is pivotably connected at one end to vehicle body 7 via a vehicle body-side rotary joint 5a and is pivotably connected at its other end to roof part 3 via a rotary joint 5b. Similarly, rear guide rod 6 is pivotably connected at one end to vehicle body 7 via a vehicle body-side rotary joint 6a and is pivotably connected at its other end to roof part 3 via a rotary joint 6b. An actuator actuates roof part kinematic system 4 for roof part kinematic system 4 to move roof part 3 between the closed and stored positions of roof 1.

Transmission kinematic system 8 is kinematically connected upstream of roof part kinematic system 4. Transmission kinematic system 8 acts on guide rods 5, 6 as roof part kinematic system 4 moves roof part 3 between the closed and stored positions of roof 1.

Transmission kinematic system 8 includes a compression spring 9, a spring lever 10, and a coupling rod 11. Coupling rod 11 kinematically couples spring lever 10 to rear guide rod 6. Spring 9 has an upper engagement point 9a engaged to an extension 5c of front guide rod 5. Upper engagement point 9a between spring 9 and front guide rod extension 5c is at a distance from rotary joint 5a of front guide rod 5. Spring base 9b is opposite from upper engagement point 9a. Spring base 9b is attached to one end of spring lever 10. Another end of spring lever 10 is pivotably connected to vehicle body 7 via a vehicle body-side rotary joint 10a. Rotary joint 10a is positioned at a distance from spring base 9b. One end of coupling rod 11 engages with spring lever 10 via another rotary joint which is situated at a distance from spring base 9a and rotary joint 10a. The other end of coupling rod 11 is pivotably connected to extension 6c of rear guide rod 6 via another rotary joint. Extension 6c of rear guide rod 6 is a fixed component of rear guide rod 6 and branches off from rotary joint 6a of rear guide rod 6. The rotary joint between coupling rod 11 and rear guide rod extension 6c is situated at a distance from rotary joint 6a of rear guide rod 6. In alternative embodiments of the present invention, spring base 9b and the rotary joint between spring lever 10 and coupling rod 11 may be omitted.

Spring 10 is in a pre-tensioned position at both the closed and stored positions of roof 1. In the closed position of roof 1 as shown in FIG. 2, spring 9 has an orientation 12 (i.e., direction or line of spring action) passing through upper spring engagement point 9a and spring base 9b. Spring orientation 12 in the closed position of roof 1 is located on the forward side (i.e., directed towards the front of the vehicle) of both rotary joint 5a of front guide rod 5 and rotary joint 10a of spring lever 10. Spring 9 is under pretension in each end position so that on account of the distance between spring engagement point 9a and front guide rod extension 5c from rotary joint 5a, an open torque is generated in the clockwise direction about rotary joint 5a. At the same time, a reaction force transmitted into spring lever 10 via spring base 9b creates a torque about rotary joint 10a for spring lever 10 in the counterclockwise direction. This torque via coupling rod 11 results in a rotational motion of rear guide rod 6 about rotary joint 6a in the clockwise direction, i.e., in the same direction as the torque about rotary joint 5a for front guide rod 5. In the closed position of roof 1, spring 9 thus generates an opening torque about rotary joint 5a for front guide rod 5 as well as an opening torque about rotary joint 6a for rear guide rod 6. In this manner the actuating forces to be applied by the actuator are minimized.

FIG. 3 illustrates front roof part 3, roof part kinematic system 4, and transmission kinematic system 8 at an intermediate position shortly before the maximum raised position of roof part 3 between the closed and stored positions of roof 1 during transfer of roof 1 from the closed position to the stored position. In this intermediate position, spring orientation 12 is still located on the forward side of rotary joints 5a and 10a for front guide rod 5 and spring lever 10, respectively, so that action direction 12 of spring 9 is still the same as it was in the closed position of roof 1 as shown in FIG. 2 and roof part 3 is further acted upon by force in the direction of the opposite end position (i.e., the stored position). However, the force produced by spring 9 at the intermediate position shown in FIG. 3 is smaller than the force produced by spring 9 at the closed position shown in FIG. 2 as spring 9 is now extended. Additionally, the effective lever arm is smaller such that the elastic effect acts corresponding to the load torque and in this case is minimized as roof 1 is near its static equilibrium position.

Figure 4:
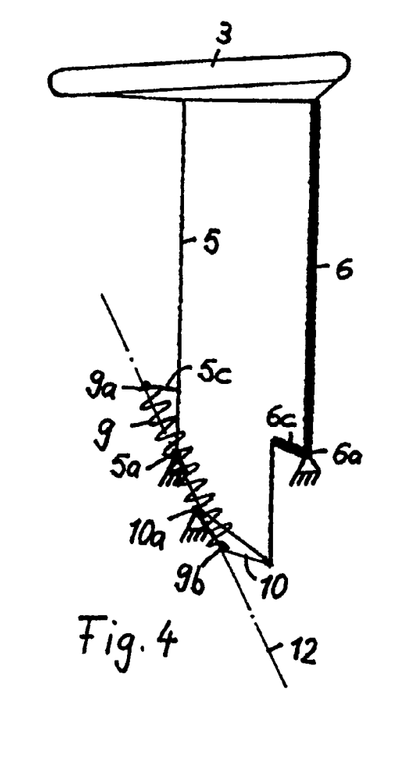
FIG. 4 illustrates the front roof part, the roof part kinematic system, and the transmission kinematic system at the maximum raised position of the front roof part which is approximately in the middle of the transfer motion of the roof from the closed position to the stored position in accordance with the first embodiment of the present invention.

FIG. 4 illustrates front roof part 3, roof part kinematic system 4, and transmission kinematic system 8 at the maximum raised position of roof part 3. The maximum raised position of roof part 3 is approximately in the middle of the transfer motion of roof 1 from the closed position to the stored position. In this maximum raised position, spring orientation 12 passes through the axes of rotary joint 5a, 10a for front guide rod 5 and spring lever 10, respectively. As a result, despite the tension which still acts in spring 9, spring 9 is not able to generate a resultant torque about rotary joints 5a and 10a. However, as roof part 3 and roof part kinematic system 4 are in a labile equilibrium position at the maximum raised position of roof part 3 further motion of roof part 3 is produced by the actuator acting on the roof part kinematic system to cause the adjustment motion of roof 1 towards the stored position. However, very low actuating forces or torques suffice for this purpose because of the equilibrium position of roof part 3 in the maximum maximized raised position. As the maximum raised position is passed the weight of roof part 3 (and roof part kinematic system 4) acts toward the stored position.

Figures 5, 6:
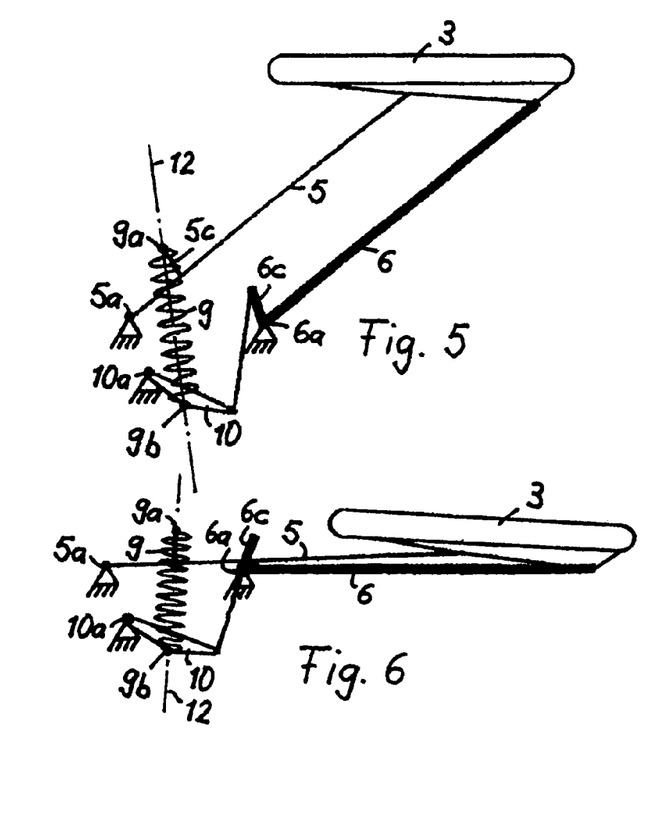
FIG. 5 illustrates the front roof part, the roof part kinematic system, and the transmission kinematic system at a position shortly before the stored position of the roof during the transfer of the roof from the closed position to the stored position in accordance with the first embodiment of the present invention.
FIG. 6 illustrates the front roof part, the roof part kinematic system, and the transmission kinematic system at the stored position of the roof after transfer of the roof from the closed position to the stored position in accordance with the first embodiment of the present invention.

FIG. 5 illustrates front roof part 3, roof part kinematic system 4, and transmission kinematic system 8 at a position shortly before the stored position of roof 1 during the transfer of roof 1 from the closed position to the stored position. That is, FIG. 3 illustrates roof part 3, roof part kinematic system 4, and transmission kinematic system 8 at a position between the maximum raised position and the stored position. As a result of the further advancement of the position of roof part 3 relative to the maximum raised position, spring orientation 12 is situated on the rear side of rotary joints 5a, 10 for front guide rod 5 and spring lever 10, respectively. As such, spring orientation 12 is situated on the opposite side compared to spring orientation 12 before the maximum raised position has been reached. Thus, spring orientation 12 (i.e., the direction of action of spring 9) has reversed such that from the initially supporting lifting action of spring 9 a decelerating action on both guide rods 5, 6 is now provided by spring 9. As a result, the deceleration forces that must be applied by the actuator are lower than in a configuration without spring 9.

FIG. 6 illustrates front roof part 3, roof part kinematic system 4, and transmission kinematic system 8 at the stored position of roof 1 after transfer of roof 1 from the closed position to the stored position. Due to the swivel motion of spring lever 10 about rotary joint 10a, spring orientation 12 changes relative to both guide rods 5, 6 such that the total torque resulting from the two effects approximately corresponds to the load torque from the weight force. In this embodiment, the leverage acting about rotary joint 6a is zero. Another combination of the effective lever arms is established in the oppositely situated closed position of roof 1 with the effect that the resultant lifting torque of the pre-tensioned transmission kinematic system 8 for lifting from roof part 3 from the closed position is close to the static load torque. This also applies in all intermediate positions.

When roof part 3 is moved back in the opposite direction, i.e., from the stored position to the closed position of roof 1, the same leverage ratios apply in any position of roof part 3 as for the transfer from the closed position to the stored position. Only the drive and deceleration directions of the actuator are exchanged. Due to the evened-out torque curve for the drive torque, which is necessary for transfer from the closed to the stored position and vice versa, relatively low drive forces or torques are sufficient in each case to carry out the adjustment motion of roof part 3.

Figure 7:
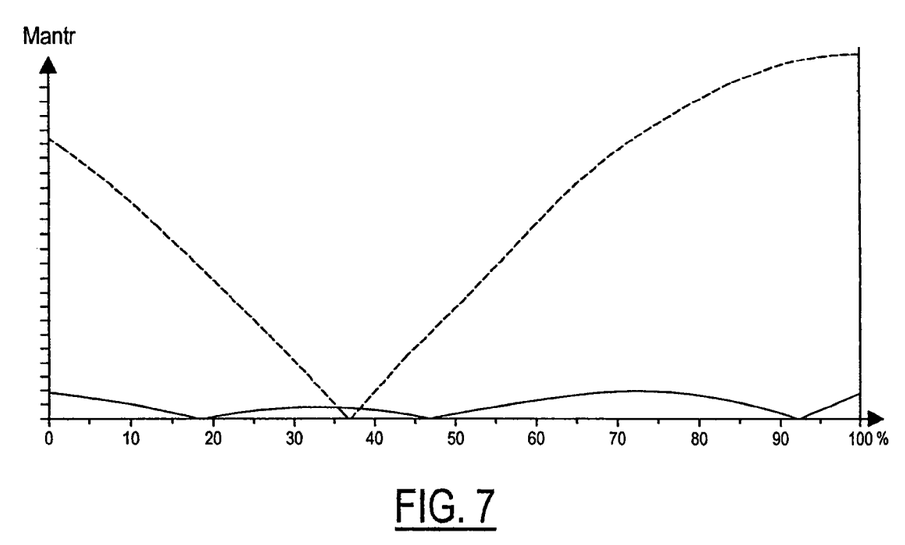
FIG. 7 illustrates drive torque plots for an actuator which actuates the roof part kinematic system with the transmission kinematic system to move the roof between the closed and stored positions in accordance with an embodiment of the present invention (solid line) and for an actuator which actuates a conventional roof kinematic system to move a roof between the closed and stored positions (dashed line)

FIG. 7 illustrates plots of the drive torque for an actuator which actuates roof part kinematic system 4 with transmission kinematic system 8 to move roof 1 between the closed and stored positions in accordance with an embodiment of the present invention (solid line) and for an actuator which actuates a conventional roof kinematic system to move a roof between the closed and stored positions (dashed line). That is, the solid plot line is the magnitude of the drive torque ($M_{Antr}$) as a function of the instantaneous position of front roof part 3 as a percentage for the kinematic sequence during the transfer of roof 1 between the closed position (kinematic sequence=0%) and the stored position (kinematic sequence=100%). Likewise, the dashed plot line is the magnitude of the drive torque as a function of the instantaneous position of a roof part of the roof having a conventional roof kinematic system as a percentage for the kinematic sequence during the transfer of the roof between the closed and stored positions.

As shown in FIG. 7, the actuator drive torque for the roof having the conventional roof kinematic system assumes a maximum in the closed position and in the stored position (i.e., in the end positions of the roof). The drive torque is reduced to zero at the apex of the roof motion between these maxima. In other words, in each end position of the roof, a maximum drive torque must be applied against the intrinsic weight of the roof to lift the roof from one end position and transfer the roof in the direction of the other end position.

In contrast, as shown in FIG. 7, the actuator drive torque for roof 1 is very flat at each position of the kinematic sequence between the closed and stored positions with a magnitude much lower than just about the magnitude of the actuator drive torque at each position of the kinematic sequence. Pronounced torque maxima do not occur and the drive torque fluctuates within a relatively small range.

FIGS. 8, 9, 10, and 11 illustrate roof part kinematic system 4 movably connecting front roof part 3 to vehicle body 7 and transmission kinematic system 8 movably connecting roof part kinematic system 4 to vehicle body 7 in accordance with a second embodiment of the present invention. FIGS. 8, 9, 10, and 11 illustrate roof part 3, roof part kinematic system 4, and transmission kinematic system 8 at various phases between the closed position of roof 1 and the stored position of roof 1. Again, FIGS. 8, 9, 10, and 11 illustrate an embodiment of the present invention with reference to roof part 3. Other embodiments of the present invention are with reference to rear roof part 2 and/or front roof part 3.

The kinematic design of the embodiment shown in FIGS. 8, 9, 10, and 11 corresponds to the kinematic design of the embodiment shown in FIGS. 2, 3, 4, 5, and 6 so that in this regard reference may be made to the descriptions provided for latter embodiment. However, a difference between the embodiments is that spring 9 is a tension spring as opposed to a compression spring. Due to its pretension in both end positions, tension spring 9 exerts a tensile force on upper engagement point 9a and spring base 9b.

Figure 8:
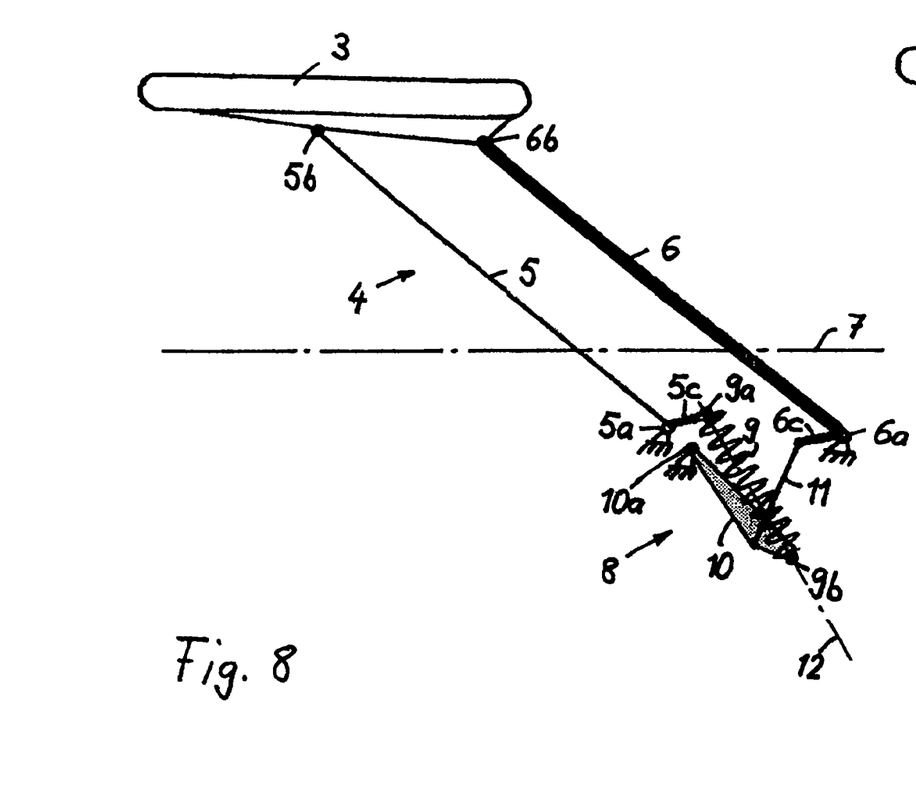
FIG. 8 illustrates a roof part kinematic system movably connecting the front roof part to the vehicle body and a transmission kinematic system movably connecting the roof part kinematic system to the vehicle body in accordance with a second embodiment of the present invention with the roof being in the closed position.

FIG. 8 illustrates front roof part 3, roof part kinematic system 4, and transmission kinematic system 8 in the closed position of roof 1. In the closed position, vehicle body-side rotary joint 5a for front guide rod 5 and vehicle body-side rotary joint 10a for spring lever 10, on which spring base 9b is also supported, are situated on the same side of spring orientation (i.e., line or direction of spring action) 12 of spring 9. Due to the pretension of spring 9 and the distance between upper connection point 9a and rotary joint 5a, a torque acting in the clockwise direction about rotary joint 5a is generated. This torque acts upon front guide rod 5 in the direction of the oppositely situated stored position. At the same time, a counterclockwise torque is generated about rotary joint 10a. On account of the geometric configuration of spring lever 10 and guide rods 5, 6, this torque is converted via coupling rod 11 and rear guide rod extension 6c into a torque acting in the clockwise direction about vehicle body-side rotary joint 6a for rear guide rod 6. As such, in the closed position, tension spring 9 produces a torque on both guide rods 5, 6 acting upon roof kinematic system 4 in the direction of the stored position.

Figure 9:
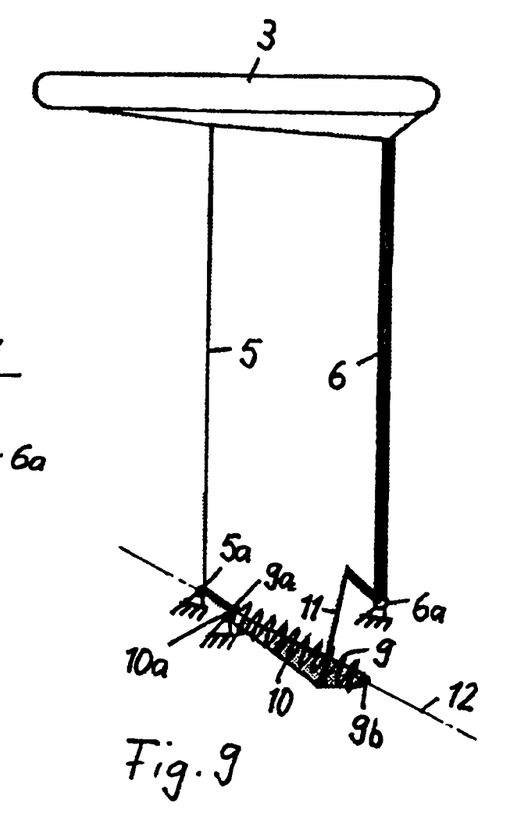
FIG. 9 illustrates the front roof part, the roof part kinematic system, and the transmission kinematic system at the maximum raised position of the front roof part which is approximately in the middle of the transfer motion of the roof from the closed position to the stored position in accordance with the second embodiment of the present invention.

FIG. 9 illustrates front roof part 3, roof part kinematic system 4, and transmission kinematic system 8 at the maximum raised position of front roof part 3 during the transfer of roof 1 from the closed position to the stored position. Spring orientation 12 approximately intersects rotary joints 5a, 10a for front guide rod 5 and spring lever 10, respectively, so that the elastic force generates little or no resultant torque.

Figure 10:
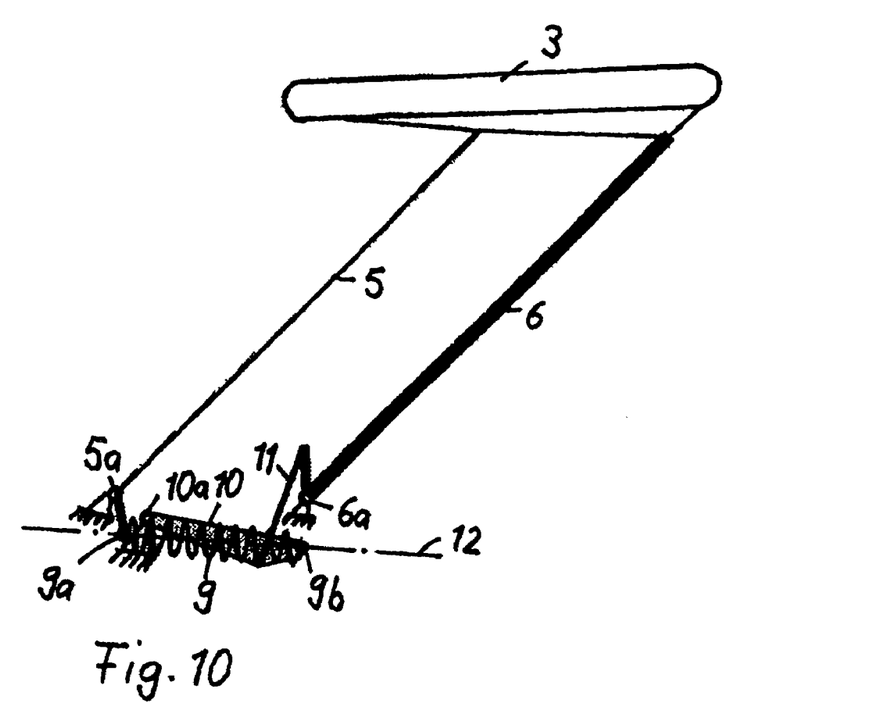
FIG. 10 illustrates the front roof part, the roof part kinematic system, and the transmission kinematic system at a position shortly before the stored position of the roof during the transfer of the roof from the closed position to the stored position in accordance with the second embodiment of the present invention.
Figure 11:
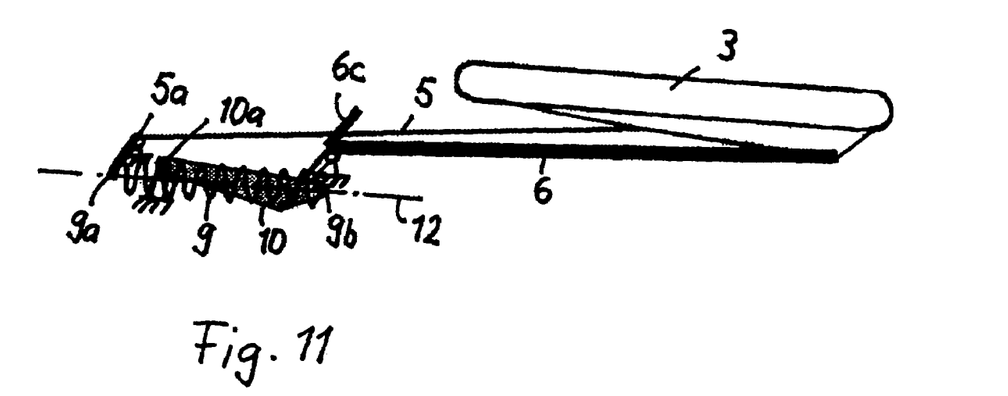
FIG. 11 illustrates the front roof part, the roof part kinematic system, and the transmission kinematic system at the stored position of the roof after transfer of the roof from the closed position to the stored position in accordance with the second embodiment of the present invention.

FIG. 10 illustrates front roof part 3, roof part kinematic system 4, and transmission kinematic system 8 at a position shortly before the stored position of roof 1 during the transfer of roof 1 from the closed position to the stored position. FIG. 11 illustrates front roof part 3, roof part kinematic system 4, and transmission kinematic system 8 at the stored position of roof 1 after transfer of roof 1 from the closed position to the stored position.

As the position of roof part 3 advances further toward the stored position from the maximum raised position, rotary joints 5a and 10a are situated on the opposite side of spring orientation 12 in comparison to spring orientation 12 in the closed position. In other words, spring orientation 12 is reversed on guide rods 5, 6. As a result, guide rods 5, 6 are now subjected to a resultant torque in the direction of the closed position. This results in an approximately balanced force or torque ratio in the further progression until the stored position is reached, in which approximate compensation is made for the intrinsic weight of roof part 3 and roof part kinematic system 4. As a result, at least an approximately balanced force or torque ratio is achieved in the lifting motion between the closed position and the maximum raised position, as well as between the maximum raised position and attainment of the stored position. The same applies for the motion of roof 1 in the opposite direction, i.e., in the transfer of roof 1 from the stored position to the closed position.

List of Reference Numerals
1 Vehicle roof
2 Rear roof part
3 Front roof part
4 Roof part kinematic system
5 Front roof guide rod
5a, b Rotary joint
5c Extension
6 Rear roof guide rod
6a, b Rotary joint
6c Extension
7 Vehicle body
8 Transmission kinematic system
9 Spring
9a Upper engagement point of spring
9b Spring base
10 Spring lever
10a Rotary joint
11 Coupling rod
12 Spring orientation (Line or direction of spring action)

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:
1. A vehicle comprising:
a roof having roof parts movably connected together such that the roof parts are movable between a closed position of the roof in which the roof parts cover the vehicle interior and a stored position of the roof in which the roof parts expose the vehicle interior;
a roof part kinematic system having a front guide rod pivotably supported at one end about a first vehicle body-side rotary joint and pivotably supported at another end to a first one of the roof parts to movably connect first roof part to the vehicle body such that upon actuation of the roof part kinematic system the roof part kinematic system moves the roof parts between the closed and stored positions; and a transmission kinematic system having a spring connected at one end to the front guide rod, wherein the spring acts on the front guide rod with a swivel torque about the first rotary joint during the transfer of the roof parts between the closed and stored positions, wherein an orientation of the spring traverses the first rotary joint during the transfer of the roof parts between the closed and stored positions;

wherein the spring has a displaceable base facing away from the front guide rod, wherein the position of the spring base is a function of the position of the first roof part during the transfer of the roof parts between the closed and stored positions.

2. The vehicle of claim 1 wherein:
the spring is adjustable by the roof part kinematic system.

3. The vehicle of claim 1 wherein:
the transmission kinematic system further includes a spring lever, wherein the spring lever is pivotably supported at one end about a second vehicle body-side rotary joint and is connected to the roof part kinematic system, wherein the spring base is mounted on the spring lever.

4. The vehicle of claim 3 wherein:
the spring orientation traverses the second rotary joint during the transfer of the roof parts between the closed and stored positions.

5. The vehicle of claim 4 wherein:
the spring orientation simultaneously traverses the first and second rotary joints during the transfer of the roof part between the closed and stored positions.

6. The vehicle of claim 5 wherein:
the spring orientation traverses the first and second rotary joints at a maximum raised position of the first roof part during the transfer of the roof parts between the closed and stored positions.

7. The vehicle of claim 3 wherein:
the roof part kinematic system further includes a rear guide rod which is parallel to the front guide rod, the rear guide rod is pivotably supported at one end about a third vehicle body-side rotary joint and is pivotably supported at another end to the first roof part;
wherein the transmission kinematic system further includes a coupling rod, wherein the spring lever is pivotably connected to the coupling rod, wherein the coupling rod is pivotably connected to the rear guide rod.

8. The vehicle of claim 1 wherein:
the roof part kinematic system includes a four-bar kinematic linkage having the front guide rod and a rear guide rod, wherein each guide rod is pivotably supported on the vehicle body at one end and is pivotably supported on the first roof part at another end.

9. The vehicle of claim 1 wherein:
the spring is one of a compression spring or a tension spring.

10. The vehicle of claim 3 wherein:
the position of the spring base coincides with the rotary joint between the spring lever and the coupling rod.

11. A movable roof assembly for a vehicle, the roof assembly comprising:
a roof having roof parts movably connected together such that the roof parts are movable between a first end position and a second position;
a roof part kinematic system having a front guide rod pivotably supported at one end about a first rotary joint and pivotably supported at another end to a first one of the roof parts such that upon actuation of the roof part kinematic system the roof part kinematic system moves the roof parts between the end positions; and
a transmission kinematic system having a spring connected at one end to the front guide rod, wherein the spring has an orientation to act on the front guide rod with a swivel torque about the first rotary joint during the transfer of the roof part between the end positions, wherein an orientation of the spring traverses the first rotary joint during the transfer of the roof parts between the end positions;
wherein the spring has a displaceable base facing away from the front guide rod, wherein the position of the spring base is a function of the position of the roof part during the transfer of the roof part between the end positions.

12. The roof assembly of claim 11 wherein:
the spring is adjustable by the roof part kinematic system.

13. The roof assembly of claim 11 wherein:
the transmission kinematic system further includes a spring lever, wherein the spring lever is pivotably supported at one end about a second rotary joint and is connected to the roof part kinematic system, wherein the spring base is mounted on the spring lever.

14. The roof assembly of claim 13 wherein:
the spring orientation traverses the second rotary joint during the transfer of the roof parts between the end positions.

15. The roof assembly of claim 14 wherein:
the spring orientation simultaneously traverses the first and second rotary joints during the transfer of the roof parts between the end positions.

16. The roof assembly of claim 15 wherein:
the spring orientation traverses the first and second rotary joints at a maximum raised position of the first roof part during the transfer of the roof parts between the end positions.

17. The roof assembly of claim 13 wherein:
the roof part kinematic system further includes a rear guide rod which is parallel to the front guide rod, the rear guide rod is pivotably supported at one end about a third rotary joint and is pivotably supported at another end to the first roof part;
wherein the transmission kinematic system further includes a coupling rod, wherein the spring lever is pivotably connected to the coupling rod, wherein the coupling rod is pivotably connected to the rear guide rod.

18. The roof assembly of claim 11 wherein:
the spring is one of a compression spring or a tension spring.

* * * * *

UNITED STATES PATENT AND TRADEMARK OFFICE
CERTIFICATE OF CORRECTION

PATENT NO. : 7,618,080 B2 Page 1 of 1
APPLICATION NO. : 11/743864
DATED : November 17, 2009
INVENTOR(S) : Gernot Bruder It is certified that error appears in the above-identified patent and that said Letters Patent is hereby corrected as shown below:

Column 10, Line 66, Claim 1:
After "movably connect" insert -- the --.

Column 11, Line 31, Claim 5:
Delete "part" and insert therefor --parts--.

Column 12, Line 16, Claim 11:
Delete "part" and insert therefor --parts--.

Signed and Sealed this

Sixteenth Day of February, 2010

David J. Kappos
*Director of the United States Patent and Trademark Office*